United States Patent [19]
Higuchi

[11] Patent Number: 5,453,203
[45] Date of Patent: Sep. 26, 1995

[54] PROCESS AND APPARATUS FOR PURIFYING LOW POLLUTED WATER

[75] Inventor: Tadao Higuchi, Inuyama, Japan

[73] Assignees: Toyo Dynam Co., Ltd.; Tokai Kosan Co., Ltd., both of Aichi, Japan

[21] Appl. No.: 141,266

[22] Filed: Oct. 22, 1993

[30] Foreign Application Priority Data

Oct. 22, 1992 [JP] Japan ................... 4-309468

[51] Int. Cl.[6] ............... C02F 1/24; C02F 1/54; C02F 1/64
[52] U.S. Cl. .......... 210/696; 210/697; 210/705; 210/718; 210/722; 210/727; 210/730; 210/199; 210/202; 210/221.2; 210/295
[58] Field of Search ................... 210/707, 696, 210/205, 206, 218, 697, 705, 718, 722, 727, 730, 199, 202, 221.2, 295

[56] References Cited

U.S. PATENT DOCUMENTS

| | | |
|---|---|---|
| 3,179,252 | 4/1965 | Vrablik . |
| 3,243,046 | 3/1966 | Kakumoto . |
| 3,506,125 | 4/1970 | Willis . |
| 3,959,131 | 5/1976 | Ramirez . |
| 3,977,970 | 8/1976 | Willis . |
| 4,280,886 | 7/1981 | Sawa . |
| 4,626,345 | 12/1986 | Krofta . |
| 4,784,764 | 11/1988 | Kleinschnittger . |
| 4,957,633 | 9/1990 | Suutarinen . |
| 5,068,031 | 11/1991 | Wang . |
| 5,076,939 | 12/1991 | Hunter . |
| 5,104,549 | 4/1992 | Kamei . |
| 5,130,029 | 7/1992 | Suutarinen . |
| 5,230,808 | 7/1993 | Chung . |
| 5,269,939 | 12/1993 | Laurent . |

FOREIGN PATENT DOCUMENTS

| | | |
|---|---|---|
| 63-190691 | 8/1988 | Japan . |
| 1549523 | 8/1979 | United Kingdom . |

*Primary Examiner*—Thomas M. Lithgow
*Attorney, Agent, or Firm*—Koda and Androlia

[57] ABSTRACT

Disclosed is a process and apparatus for purifying a low polluted water containing concurrently or selectively inadequate matters including heavy metals such as iron contents and manganese, and fine suspended matters, which comprises adding a reactant primarily containing a colloidal silica from a reactant charger to the polluted water stored in a primary tank to emulsify the inadequate matters; adding a coagulant primarily containing chitosan into the polluted water from a coagulant charger; feeding external air under high pressure by a pump into the polluted water, and separating the air from the polluted water, followed by dissolution of the air under pressure in the polluted water using a water separator; injecting the thus treated polluted water into a polluted water stored preliminarily in a secondary tank to generate very fine bubbles in polluted water stored in the secondary tank under releasing of the pressure; allowing the inadequate matters emulsified and flocculated to float up onto the water surface together with the very fine bubbles and removing them; and discharging the thus purified water obtained after removal of the inadequate matters.

1 Claim, 1 Drawing Sheet

PROCESS AND APPARATUS FOR PURIFYING LOW POLLUTED WATER

BACKGROUND OF THE INVENTION

This invention relates to a process for purifying a low polluted water, in which heavy metals, such as iron contents and manganese, and very fine suspended matters (these are all hereinafter referred generally to as "inadequate matters") concurrently or selectively contained in the low polluted water are continuously removed to provide a highly purified water, as well as, to an apparatus for practicing the process.

In those areas poorly equipped with water service, well water is used singly or in combination with service water so as to cope with lack of water during summer or with the raise in the water charge. In the case of well water, those which were proved to conform with the standard quality of drinking water analysis carried out by an organization such as public health center are used as drinking waters for human. However, depending on the configuration of the ground in which wells are bored, the well waters sometimes contain heavy metals such as iron contents and manganese in an amount beyond the allowable level. While the iron contents do not undergo oxidation in the underground water containing a low level of oxygen, they are oxidized upon contact with oxygen when pumped up to the ground surface, causing so-called a state of red water. Such well water containing a high level of iron contents is not generally suitable as the drinking water for human.

Meanwhile, in the case of service water, a water is subjected to sedimentation and filtration treatments in a large scale purifying facility, as well as, to sterilization treatment using chlorine and the like before distributed throughout a city. However, if a large amount of heavy metals such as iron contents and manganese are contained in the raw water for water service and water consumption sometimes jumps up like during summer, the dwell time of the raw water in the purifying facility where it is subjected to sedimentation and filtration becomes short. Accordingly, an insufficiently treated water still containing some amount of heavy metals such as iron contents and manganese is supplied generally to every household etc. Thus, the service water during summer comes to contain a particularly large amount of iron content and tastes bad.

For example, if such well water containing a large amount of iron content is used as an industrial water, rusting occurs in the piping system of machinery and the like to cause corrosion or clogging in the pipes, giving serious damage in the maintenance of the equipments. Meanwhile, it is known in the field of stockbreeding, if such well water containing a large amount of iron contents is used as such as a drinking water for cows and pigs, the iron contents react with phosphoric acid etc. in their bodies to make the animals to have acidic constitution, inhibiting absorption of nutrients and affecting normal growth of the animals. Further, if such water containing a large amount of iron contents, manganese, etc. is used for irrigation in the field of agriculture, horticulture, etc., the mineral composition in the soil is ill-balanced to inhibit absorption of nutrients by fruits, vegetables and garden plants, causing troubles such as depauperation or suffering from various diseases due to reduction in the resistance to the pathogenic bacteria. Therefore, it is desirable to remove the inadequate matters including iron contents and manganeses as much as possible not only when low polluted waters such as well water and the like are used as the drinking water for human, but also when they are used as the drinking water for livestock in the field of stockbreeding or for irrigation in the field of agriculture or horticulture.

Thus, for example, when iron contents are to be removed from a well water, there has been no other way of purification but to add an oxidizing agent to the well water to convert the ionized iron to iron oxide, which is then aggregated using a high polymer and removed by sedimentation and filtration. In this case, large-scale equipments including sedimentation tanks, filtration tanks, etc. are necessary, leading to extreme elevation of production cost and running cost of the facility, disadvantageously. Meanwhile, in the method in which an oxidizing agent is used for water purification, although the iron contents can be converted into iron oxide, it is not very effective for removing manganese. Namely, while an underground water containing a large amount of iron contents generally contains a large amount of manganese, and if the iron contents only can thus be removed from the waters, the manganese must be removed by carrying out another treatment, requiring large-scale equipments and a high cost for the extra treatment, under the present circumstances. Further, the low polluted water generally contains frequently very fine organic suspended matters in addition to the heavy metals such as iron and manganese, and the organic suspended matters are difficult to remove using a coagulant. Accordingly, a sand or active carbon filter must be used for adsorbing and filtering off the organic suspended matters thereon. However, if the adsorption capacity of the filter is reduced, the water from which the pollutive components are not fully removed comes to be supplied. Besides, the filter must be replaced periodically, leading to cost elevation, and if such replacement of filter is neglected, the unpurified water comes to be supplied, inconveniently.

Therefore, this invention is proposed in view of various troubles brought about by the low polluted water (e.g. well water and insufficiently treated water supplied from a water purifying station) in which inadequate matters including heavy metals, such as iron contents, manganese and very fine suspended matters are concurrently or selectively contained and overcoming them successfully, and it is an object of the invention to provide a process for purifying a low polluted water containing inadequate matters typified by the iron contents to high purity using very simple means, as well as, an apparatus for practicing the process.

SUMMARY OF THE INVENTION

In order to overcome the above problems and attain the intended objects, this invention provides a process for purifying a low polluted water containing concurrently or selectively inadequate matters including heavy metals such as iron contents and manganese, and fine suspended matters. The process comprises adding a reactant primarily containing a colloidal silica to the polluted water to react it with the inadequate matters contained in the polluted water and effect emulsification of the inadequate matters; adding a coagulant primarily containing chitosan into the polluted water in the process that the polluted water already containing the reactant is fed; charging external air under high pressure into the polluted water being pumped, and separating the air from the polluted water, followed by dissolution of the air under pressure in the polluted water; injecting the thus treated polluted water in which the air is dissolved under pressure into a polluted water stored preliminarily to generate very fine bubbles in the latter stored polluted water under releasing of the pressure; allowing the inadequate matters emulsified by the reactant and flocculated by the coagulant to float up onto the water surface together with the very fine bubbles and removing them; and discharging the thus purified water obtained after removal of the inadequate matters to be used for various purposes.

Meanwhile, in order to overcome the above problems and attain the intended objects, this invention provides an apparatus for purifying a low polluted water containing concurrently or selectively inadequate matters including heavy metals such as iron contents and manganese, and fine suspended matters. The apparatus comprises a primary tank for storing the low polluted water containing concurrently or selectively inadequate matters including heavy metals such as iron contents and manganese, and fine suspended matters; a reactant charger for metering and charging a reactant primarily containing a colloidal silica to the low polluted water in the primary tank to emulsify the inadequate matters contained in the polluted water in the primary tank to which the reactant is added; a coagulant charger connected to a pipe led out of the primary tank, for metering and charging a coagulant primarily containing chitosan into the polluted water; a pump connected to the pipe at a position downstream the coagulant charging position for feeding the polluted water to which the coagulant is already added and charging external air under high pressure into the polluted water being fed by a pump; a water separator for separating the air from the polluted water to which the external air is injected by the pump, followed by dissolution of the air under pressure in the polluted water; a secondary tank in which a predetermined amount of the low polluted water is stored beforehand, and the polluted water subjected to water-gas separation is injected together with the very fine bubbles into the latter stored polluted water under releasing of the pressure; an inadequate matter removing unit disposed at the top of the secondary tank for recovering the inadequate matters entrapped with the very fine bubbles floating up onto the water surface by injecting the treated polluted water and discharging them to the outside of the apparatus; and a purified water discharging section provided adjacent to the secondary tank, for discharging the purified water obtained after removal of the inadequate matters to the outside of the apparatus.

BRIEF DESCRIPTION OF THE DRAWING

The features of this invention that are believed to be novel are set forth with particularity in the appended claims. The invention, together with the objects and advantages thereof, may best be understood by reference to the following description of the preferred embodiments taken in conjunction with the accompanying drawing:

DETAILED DESCRIPTION OF THE INVENTION

Figure 1:
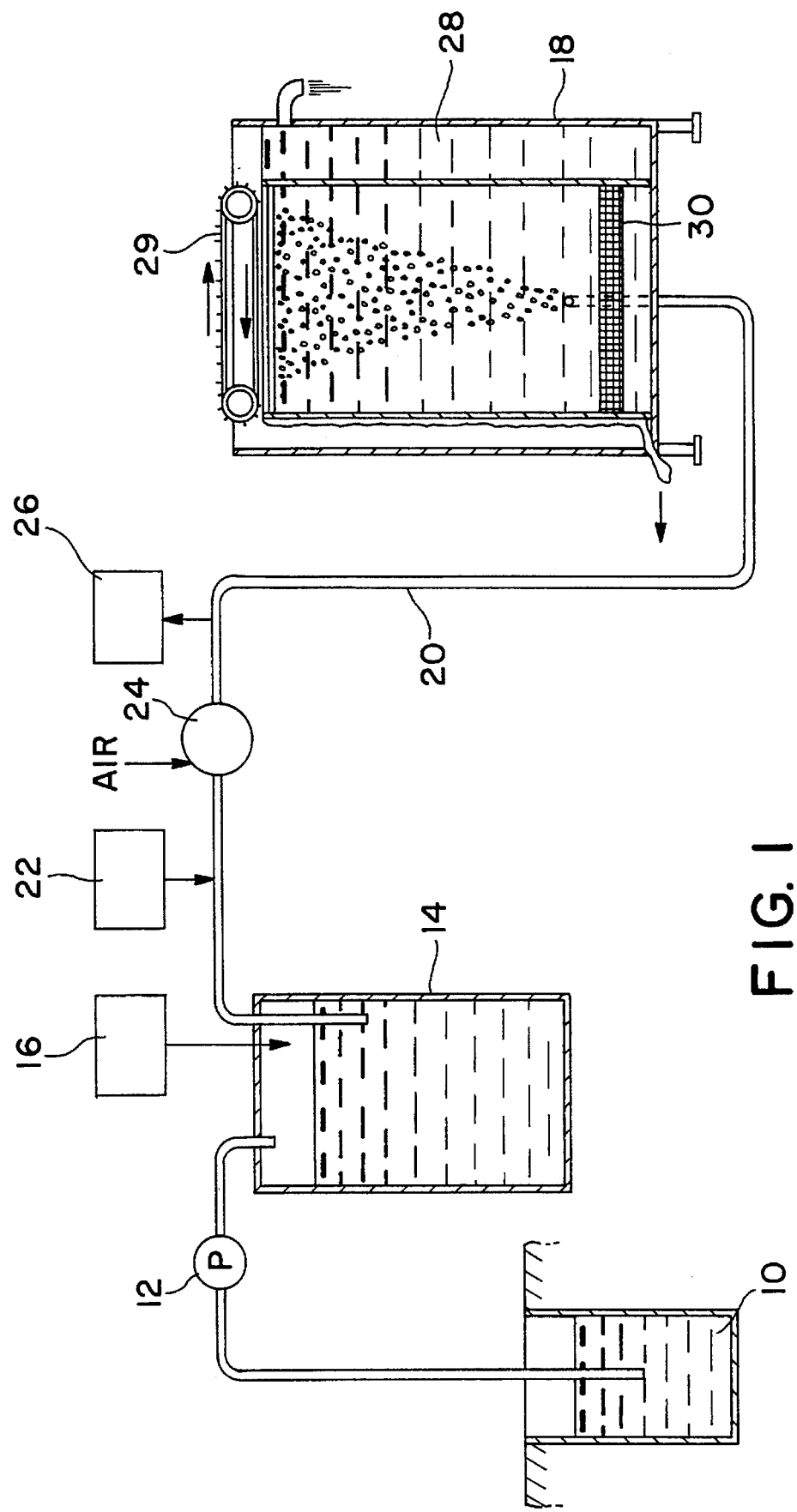
FIG. 1 shows schematically a block diagram of an apparatus for purifying a low polluted water according to this invention.

The process and apparatus for purifying a low polluted water according to this invention will now be described by way of a preferred embodiment referring to the attached drawing. FIG. 1 shows schematically the constitution of the apparatus for purifying a low polluted water according to this invention. The preferred embodiment is described with respect to the case where a well water (low polluted water) containing relatively large amounts of iron contents, manganese, etc. is to be purified. An underground well water 10 is pumped up by a pump 12 and stored in a predetermined amount in a primary tank 14. A reactant charger 16 filled with a reactant primarily containing a colloidal silica is disposed adjacent to the primary tank 14, so that the reactant may be metered and added to the low polluted water contained in the tank 14. The reactant contains a colloidal silica as the major component, an animal soluble lime and a complex of very small amounts of various elements. The mineral components and the protease contained in the reactant react with the inadequate matters such as heavy metals including iron contents and manganese or very fine suspended matters dissolved or suspended in the low polluted water to emulsify them. The composition of the reactant is as shown in the following table.

| Composition of Reactant | | | |
|---|---|---|---|
| Calcium | 45 | Cobalt | 0.12 |
| Colloidal silica | 25 | Titanium | 0.20 |
| Humic acid | 10 | Zinc | 0.03 |
| Magnesium | 2.37 | Boron | trace |
| Iron content | 0.61 | Nitrogen | 0.09 |
| Manganese | 0.75 | Phosphorus | 0.13 |
| Cooper | 0.09 | Potassium | 0.47 |
| Sodium | 0.77 | | |

As described above, the inadequate matters such as iron contents and manganese contained in the low polluted water react with the reactant to be emulsified in the primary tank 14. The low polluted water in the primary tank 14 is fed out therefrom through a pipe 20 connected to a secondary tank 18 to be described later. More specifically, a coagulant charger 22 is connected to the pipe 20 so that the coagulant may be metered and added to the low polluted water to which the reactant is already added. The coagulant to be added by the coagulant charger 22 comprises chitosan contained, for example, in the crab shell and exhibits a superb effect of flocculating the inadequate matters emulsified with the reactant. The pipe 20 has a high-pressure pump 24 downstream the coagulant charging position thereof, and the low polluted water fed out of the primary tank 14 and admixed with the coagulant is designed to be pumped toward the secondary tank 18. The pump 24 is provided with an air inlet and a mechanism for introducing the external air into the low polluted water under high pressure during operation of the pump. As the high-pressure pump 24, it is recommendable to use, for example, a Furan self-priming pump KPD (trade name) manufactured by Futakuni Kikai Kyogyo Kabushiki-Kaisha.

A water separator 26 is is connected to the pipe 20 at a position between the outlet side of the pump 24 and the secondary tank 18. The water separator 26 is directed to carry out separation of the air from the low polluted water containing the external air charged by the pump 24 so as to allow the air to be dissolved in the polluted water under pressure. In other words, air is dissolved under pressure in the low polluted water subjected to water separation, so that when the thus treated polluted water is released into a water under normal pressure, the air floats up in the water in the form of a multiplicity of fine bubbles. The secondary tank 18 to which the terminal end of the pipe 20 is connected can store beforehand therein a predetermined amount of low polluted water, into which the polluted water subjected to water separation treatment is blown, and is adapted to allow a large amount of fine bubbles to be generated by releasing the pressure. Since the bubbles float up onto the water surface entrapping the inadequate matters to gradually form a sludge layer, the sludge is designed to be discharged periodically, for example, by a conveyor 29 disposed above the secondary tank 18. Incidentally, the conveyor 29 is given as an example, and a step may be provided at the upper end face on one side of the secondary tank 18 instead of the conveyor 29 so as to allow the sludge to overflow the step to be discharged to the outside of the secondary tank 18. In the case where the overflow system is employed, it is recommendable to blow air in one direction against the sludge floating up to the water surface to accelerate overflowing of the sludge.

The secondary tank 18 has a purified water discharging section 28 contiguous thereto, in which the purified water after removal of the inadequate matters can be recovered to be discharged to the outside. A filter 30 is disposed at the bottom of the secondary tank 18 so as to filter the purified water, and the tank 18 and the purified water discharging section 28 are in a liquid communicating relationship through the filter 30. The filter 30 is not an essential constituent in this invention, and it is disposed additionally to ensure removal of the inadequate matters when the purified water is used as the drinking water for human and can be omitted when the purified water is used as an industrial water or in stockbreeding, agriculture, horticulture, etc.

Next, application of the thus constituted apparatus for purifying a low polluted water will be described, for example, with respect to the case where a well water containing relatively large amounts of iron contents and manganese is to be purified. In FIG. 1, the underground well water 10 is pumped up by the pump 12 and stored in a predetermined amount in the primary tank 14, while a predetermined amount of well water is also stored in the secondary tank 18. The reactant containing primarily a colloidal silica is metered and added to the well water contained in the primary tank 14 by the reactant charger 16, whereby the iron contents and manganese present in the well water contained in the primary tank 14 are allowed to react with the mineral components and protease and emulsified. The well water contained in the primary tank 14 is fed under the action of the high-pressure pump 24 through the pipe 20 to the secondary tank 18.

The coagulant is metered and added by the coagulant charger 22 connected to the pipe 20 to the well water, to which the the reactant is already admixed, being fed through the pipe 20. Namely, the coagulant primarily containing chitosan contained, for example, in the crab shell flocculates the iron contents and manganese emulsified by the reactant contained in the well water. However, since the well water is being fed through the pipe 20 in this stage, the flocks are not yet separated from the water. Meanwhile, the external air is fed under high pressure into the well water as the high-pressure pump 24 is operated at a position downstream the coagulant charging position of the pipe 20. The water separator 26 connected to the pipe 20 communicating to the outlet side of the pump 24 carries out separation of air from the well water containing the external air. Thus, a large amount of air comes to be dissolved in the well water flowing the limited space of the pipe 20 under pressure.

As described above, the well water in which air is dissolved under pressure is fed through the pipe 20 finally into the well water stored preliminarily in the secondary tank 18. The pressure applied to the well water in the pipe 20 is released, when the well water is blown into the well water contained in the secondary tank 18, and the well water flows up forming very fine bubbles. The iron contents and manganese contained in the well water fed into the secondary tank 18 are emulsified by the reactant and flocculated by the coagulant into flocks. The flocks are entrapped by the very fine bubbles formed in a large amount when the pressure applied to the well water is released in the secondary tank 18 and floats up with the bubbles onto the water surface to gradually form there a sludge layer. The sludge is discharged periodically by means of the conveyor 29 disposed above the secondary tank 18 or the overflow system. The purified water obtained after removal of the inadequate matters such as iron contents and manganese is discharged through the purified water discharging section 28 formed contiguous to the secondary tank 18 to the outside and used for various purposes. While a filter 30 may be disposed at the bottom of the secondary tank 18, the filter 30 is disposed additionally to ensure removal of the flocks when the purified water is to be used as the drinking water for human, and it can be omitted when the purified water is used as the industrial water or for stockbreeding, agriculture, horticulture, etc. The analysis of the thus purified water demonstrated a good result in that it is suitable for drinking.

What is claimed is:

1. A process for purifying a low polluted water containing concurrently or selectively inadequate matters selected from the group consisting of iron, manganese, fine suspended matters and mixtures thereof, said process comprising:

adding a reactant primarily containing a colloidal silica to said polluted water to react it with said inadequate matters contained in said polluted water and effect emulsification of said inadequate matters;

adding a coagulant primarily containing chitosan into said polluted water already containing said reactant containing said colloidal silica;

pumping said polluted water which as been treated by said colloidal silica and chitosan and charging external air under high pressure into said polluted water being pumped, separating the air from said polluted water, followed by dissolution of the air under pressure in said polluted water;

injecting the thus treated polluted water in which the air is dissolved under pressure into a separator tank having water under normal pressure to generate very fine bubbles in said polluted water upon releasing of the pressure;

allowing said inadequate matters emulsified by said reactant and flocculated by said coagulant to float up onto the water surface together with said very fine bubbles and removing them; and discharging the thus purified water obtained after removal of said inadequate matters from said separator tank.

* * * * *